(12) United States Patent
Chang

(10) Patent No.: US 12,498,066 B1
(45) Date of Patent: Dec. 16, 2025

(54) QUICK CONNECTOR STRUCTURE OF FLUID SHOCK ABSORBER

(71) Applicant: HO SING ENTERPRISES CO., LTD., Changhua County (TW)

(72) Inventor: Wen-Shan Chang, Changhua County (TW)

(73) Assignee: HO SING ENTERPRISES CO., LTD., Changhua County (TW)

( * ) Notice: Subject to any disclaimer, the term of this patent is extended or adjusted under 35 U.S.C. 154(b) by 0 days.

(21) Appl. No.: 18/741,707

(22) Filed: Jun. 12, 2024

(51) Int. Cl.
*F16L 55/02* (2006.01)
*F16L 37/088* (2006.01)

(52) U.S. Cl.
CPC ............ *F16L 37/088* (2013.01); *F16L 55/02* (2013.01); *Y10T 137/6995* (2015.04)

(58) Field of Classification Search
CPC ....... F16L 55/043; F16L 55/02; F16L 55/041; F16L 37/088; F16L 37/0887; F16L 37/10; F16L 37/101; F16L 37/107; F16L 37/113; F16L 37/1225; F16L 37/24; F16L 37/244; F16L 37/248; F16L 37/252; E02D 29/12; B65D 90/10; B65D 90/105; E03F 5/02; E03F 5/22; E03B 5/00; E03B 7/00; E03B 7/072; E03B 7/095; E03B 9/08; E03B 9/10; E03B 9/12; F16K 27/12; F16K 31/46; A01G 25/16; G01F 15/18; Y10T 137/6995
USPC .................. 137/315.11, 356, 363–372, 154; 220/727, 293–302
See application file for complete search history.

(56) References Cited

U.S. PATENT DOCUMENTS

| | | | | |
|---|---|---|---|---|
| 3,952,908 A * | 4/1976 | Carson | ..................... | H02B 1/06 220/831 |
| 4,163,503 A * | 8/1979 | McKinnon | ............... | H02G 9/10 220/254.3 |
| 4,872,575 A * | 10/1989 | Kobilan | ................... | H02G 9/10 220/234 |
| 4,959,506 A * | 9/1990 | Petty | ....................... | H02G 3/14 174/669 |
| 5,538,035 A * | 7/1996 | Gavin | ...................... | F16L 5/10 52/20 |
| 5,634,566 A * | 6/1997 | Jansen | ................. | B65F 1/1615 220/254.1 |
| 6,460,563 B2 * | 10/2002 | Olson | .................... | A01G 25/16 137/364 |

(Continued)

*Primary Examiner* — Craig J Price
(74) *Attorney, Agent, or Firm* — LANWAY IPR SERVICES; Chun-Ming Shih

(57) ABSTRACT

A quick connector structure of a fluid shock absorber is applicable for a pipeline box configured to connect with a connection valve of at least one pipe line, and the pipeline box includes a coupling orifice configured to connect with the connection valve. The connection valve includes a fixer which has a cylinder, multiple positioning bosses, at least one U-shaped recess, and multiple flexible portions. The coupling orifice has multiple notches, and the coupling orifice also has multiple cutouts corresponding to the multiple flexible portions of the fixer. The coupling orifice accommodates the connection valve, and the multiple notches are engaged with the multiple positioning bosses, thus fixing the connection valve. The pipeline box includes a defining ring, and the defining ring has multiple indents and at least one U-shaped fixing portion. The at least one U-shaped fixing portion is fixed in a same direction as the U-shaped recess.

3 Claims, 6 Drawing Sheets

(56) References Cited

U.S. PATENT DOCUMENTS

| | | | | |
|---|---|---|---|---|
| 6,739,472 B2 * | 5/2004 | Newport | ............ | B60K 15/0406 |
| | | | | 220/293 |
| 6,749,080 B1 * | 6/2004 | White | ................. | E03B 7/095 |
| | | | | 137/381 |
| 6,902,206 B2 * | 6/2005 | Zenko | ................. | F16L 37/008 |
| | | | | 285/305 |
| 6,932,099 B2 * | 8/2005 | Mahaney | ................. | H02G 9/10 |
| | | | | 137/364 |
| 7,004,677 B1 * | 2/2006 | Ericksen | ............. | A01G 25/162 |
| | | | | 137/364 |
| 7,243,810 B2 * | 7/2007 | O'Brien | ................. | G01F 15/14 |
| | | | | 220/4.24 |
| 7,434,845 B2 * | 10/2008 | Ogiso | ................... | F16L 33/30 |
| | | | | 285/259 |
| 8,567,432 B2 * | 10/2013 | Ericksen | ................. | E03B 1/00 |
| | | | | 137/382 |
| 9,518,369 B2 * | 12/2016 | Ducote | ............. | E02D 29/1409 |
| 10,300,903 B2 * | 5/2019 | Stiatti | ................. | B60W 10/06 |
| 11,480,277 B2 * | 10/2022 | Trotter | ................ | F16L 37/0885 |
| 11,509,125 B1 * | 11/2022 | Dembkoski | ............ | H02G 3/086 |
| 11,976,761 B2 * | 5/2024 | Düperthal | ............. | F16L 37/101 |
| 12,121,922 B2 * | 10/2024 | Wilkey | ................ | B05B 15/658 |
| 12,215,813 B2 * | 2/2025 | Wester | ................ | F16L 37/1225 |
| 2014/0291984 A1 * | 10/2014 | Dorsch | ............... | F16L 25/0045 |
| | | | | 285/315 |
| 2024/0280198 A1 * | 8/2024 | Perherin | ............... | F16L 27/113 |

\* cited by examiner

QUICK CONNECTOR STRUCTURE OF FLUID SHOCK ABSORBER

TECHNICAL FIELD

The present invention relates to a quick connector structure, and more particularly to the quick connector structure of a fluid shock absorber which is configured to connect the connection valve for a tap water tank and a pipeline box securely.

BACKGROUND

Conventionally, complex pipes such as tap water tanks, faucet pipes or the use of waste water collection will collect the aforementioned pipes and connect them to a pipe box to supply indoor cold water, hot water or warm water according to demand, or to introduce waste water into the sewer.

The aforementioned pipeline box is equipped with a pipeline, and the pipeline has a connecting valve to open and close the pipeline. The connecting valve can be connected to a faucet pipeline or a wastewater pipeline, and the corresponding actions can be performed through the pipeline.

The main purpose of the pipeline box is to facilitate the management of pipelines and avoid problems such as malfunction caused by malfunction of the pipeline. Further, a mounting hole will be drilled at the connection between the pipeline box and the connecting valve. The connecting valve will be installed and then a nut will be used to screw it on. The connecting valve achieves the effect of fixing the connecting valve in the pipe box and slowing down the vibration of the fluid.

However, if the nut is screwed, the nut will gradually loosen due to the slight vibration caused by the passage of fluid in the pipeline or connecting valve.

The present invention has arisen to mitigate and/or obviate the afore-described disadvantages.

SUMMARY

The primary aspect of the present invention is to provide a quick connector structure of a fluid shock absorber which is capable of simplifying connection of the connection valve and a pipeline box, and the at least one U-shaped fixing portion is fixed in a same direction as the U-shaped recess to avoid a removal of the connection valve and the pipe line.

To obtain above-mentioned aspect, a quick connector structure of a fluid shock absorber provided by the present invention is applicable for a pipeline box, and the pipeline box is configured to connect with a connection valve of at least one pipe line, the pipeline box includes a coupling orifice configured to connect with the connection valve.

The connection valve includes a fixer, and the fixer has a cylinder, multiple positioning bosses formed on an outer wall of the cylinder, at least one U-shaped recess defined below the multiple positioning bosses, and multiple flexible portions extending outward from the at least one U-shaped recess.

The coupling orifice of the pipeline box has multiple notches defined therein and corresponding to the multiple positioning bosses, and the coupling orifice also has multiple cutouts corresponding to the multiple flexible portions of the fixer. The coupling orifice of the pipeline box accommodates the connection valve, and the multiple notches are engaged with the multiple positioning bosses, thus fixing the connection valve.

The pipeline box includes a defining ring, and the defining ring has multiple indents arranged on a center thereof in a cross shape, at least one U-shaped fixing portion corresponding to two opposite indents of the multiple indents. The at least one U-shaped fixing portion is fixed in a same direction as the U-shaped recess.

The defining ring is fitted on the fixer, and the defining ring is rotated so that the at least one U-shaped fixing portion of the multiple indents is engaged with the multiple flexible portions, thus fixing the connection valve on the pipeline box. When desiring to maintain connection valve, the rotation portion is rotated to drive the defining ring to revolve, and the multiple flexible portions rotatably remove from the at least one U-shaped fixing portion, thus detaching the defining ring from the fixer.

Preferably, the cylinder has a hexagonal head formed on an end thereof.

Preferably, the coupling orifice also has multiple cutouts corresponding to the multiple flexible portions of the fixer.

Preferably, the defining ring further includes two rotation portions symmetrically formed on an outer wall thereof.

In operation, the defining ring is fitted on the fixer, and the defining ring is rotated so that the at least one U-shaped fixing portion of the multiple indents is engaged with the multiple flexible portions, thus fixing the connection valve on the pipeline box. When desiring to maintain the connection valve, the rotation portion is rotated to drive the defining ring to revolve, and the multiple flexible portions rotatably remove from the at least one U-shaped fixing portion, thus detaching the defining ring from the fixer.

Thereby, the connection valve is fitted on the fixer and is inserted in the pipeline box, and the defining ring is fitted on a bottom of the fixer to manually connect the connection valve, the fixer, and the defining ring easily.

Preferably, the multiple flexible portions are engaged on the at least one U-shaped fixing portion securely to avoid a removal, and the at least one U-shaped fixing portion is fixed in the same direction as the U-shaped recess to avoid the removal of the defining ring from the connection valve.

DETAILED DESCRIPTION

Figure 1:
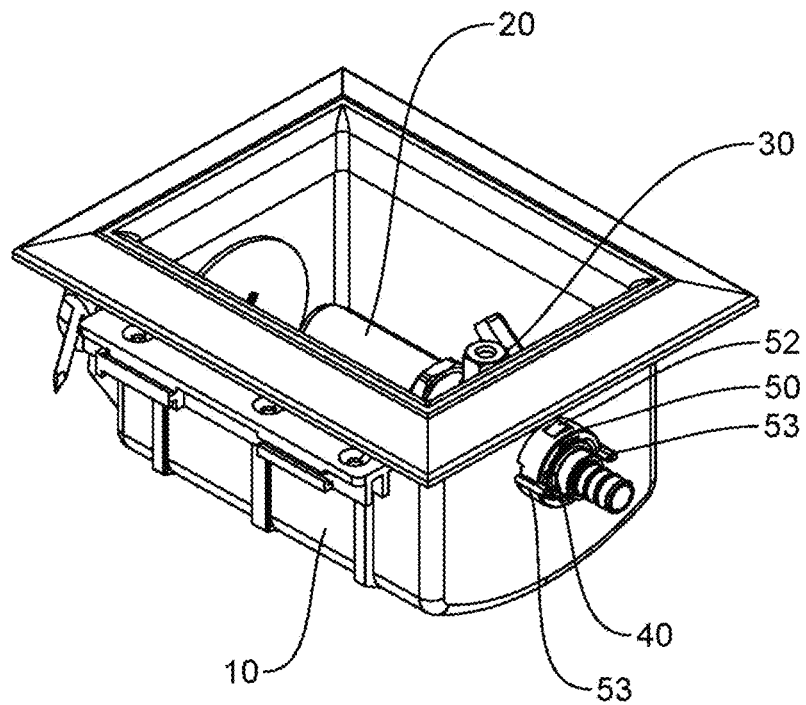
FIG. 1 is a perspective view showing the assembly of a quick connector structure of a fluid shock absorber according to a preferred embodiment of the present invention.
Figure 2:
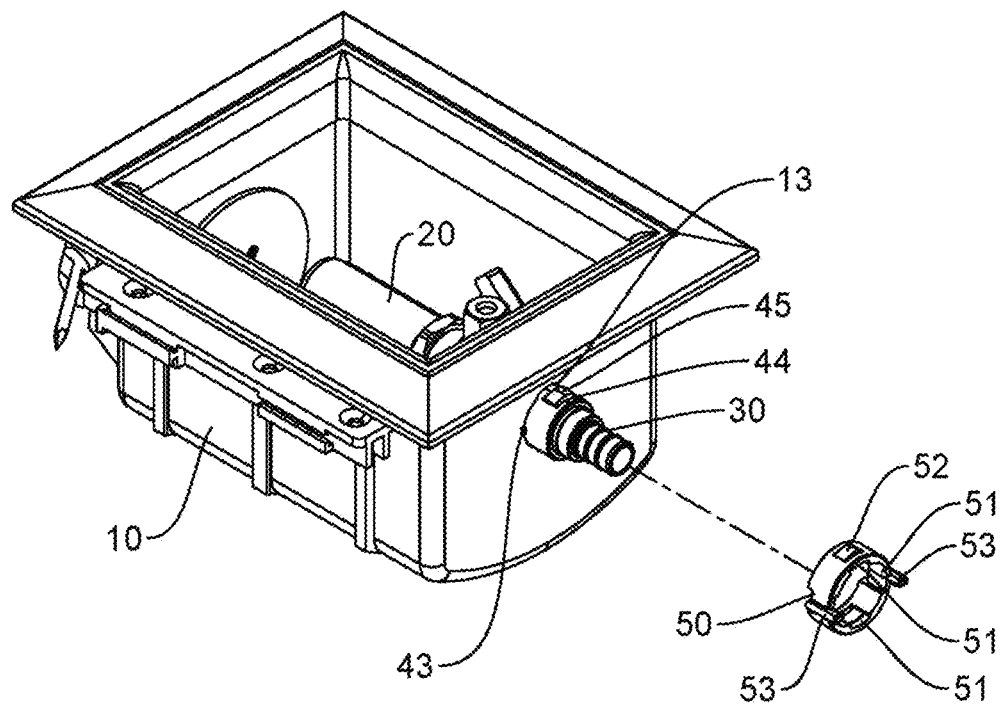
FIG. 2 is a perspective view showing the exploded components of the quick connector structure of the fluid shock absorber according to the preferred embodiment of the present invention.
Figure 3:
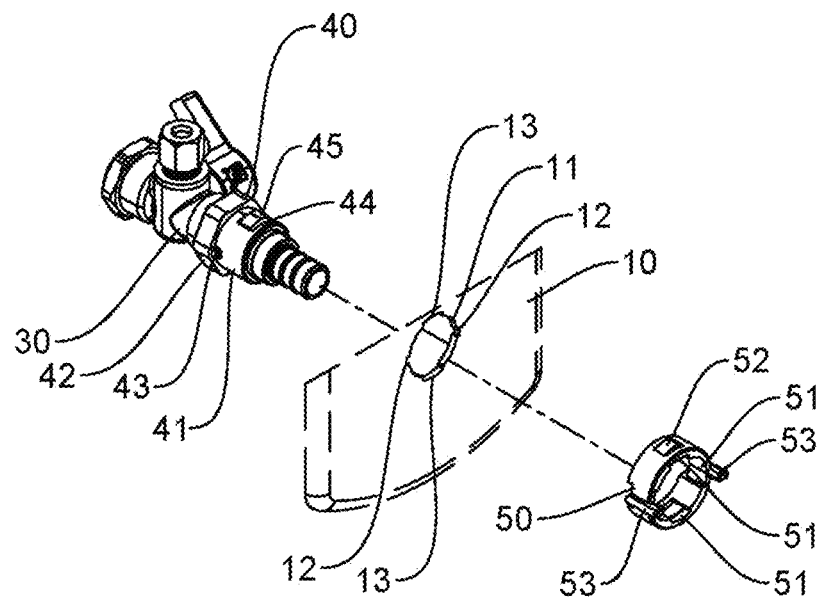
FIG. 3 is a perspective view showing the exploded components of a part of the quick connector structure of the fluid shock absorber according to the preferred embodiment of the present invention.

With reference to FIGS. 1-3, a quick connector structure of a fluid shock absorber according to a preferred embodiment of the present invention is applicable for a pipeline box 10, and the pipeline box 10 is configured to connect with a connection valve 30 of at least one pipe line 20, wherein the pipeline box 10 includes a coupling orifice 11 configured to connect with the connection valve 30.

Referring to FIGS. 1-3, the connection valve 30 includes a fixer 40, and the fixer 40 has a cylinder 41, a hexagonal head 42 formed on an end of the cylinder 41, multiple positioning bosses 43 formed on an outer wall of the cylinder 41, at least one U-shaped recess 44 defined below the multiple positioning bosses 43, and multiple flexible portions 45 extending outward from the at least one U-shaped recess 44.

As shown in FIGS. 2 and 3, the coupling orifice 11 of the pipeline box 10 has multiple notches 12 defined therein and corresponding to the multiple positioning bosses 42, and the coupling orifice 11 also has multiple cutouts 13 corresponding to the multiple flexible portions 45 of the fixer 40.

As illustrated in FIGS. 2-3, the pipeline box 10 includes a defining ring 50, and the defining ring 50 has multiple indents 51 arranged on a center thereof in a cross shape, at least one U-shaped fixing portion 52 corresponding to two opposite indents 51 of the multiple indents 51, wherein the at least one U-shaped fixing portion 52 is fixed in a same direction as the U-shaped recess 44. In addition, the defining ring 50 further includes two rotation portions 53 symmetrically formed on an outer wall thereof.

Figure 4:
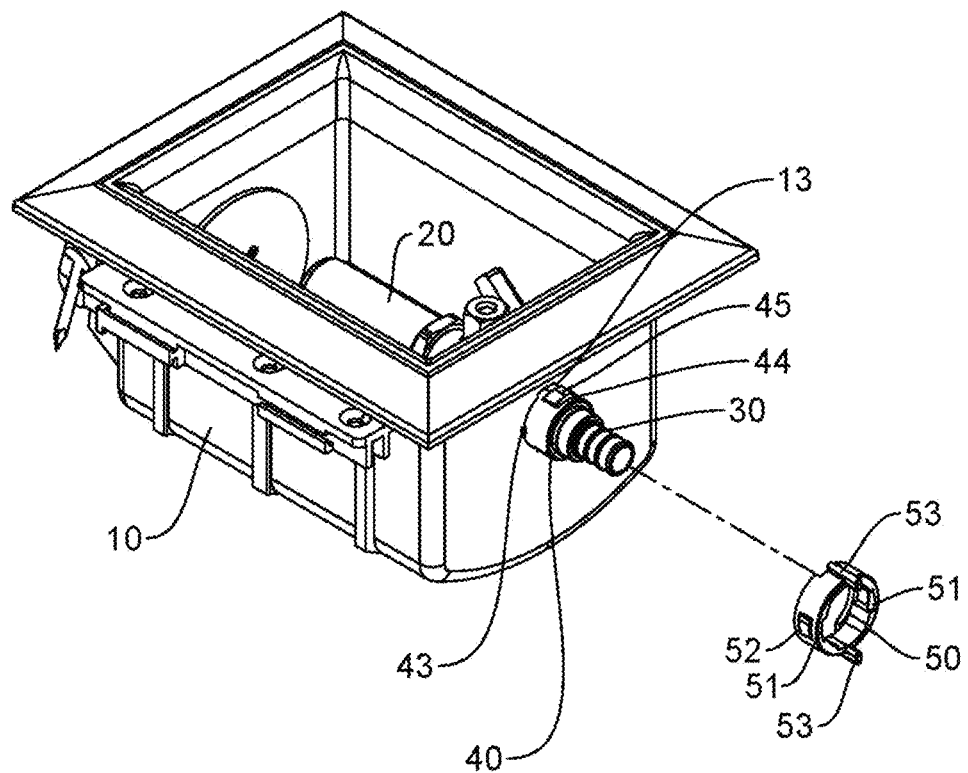
FIG. 4 is a perspective view showing the operation of the quick connector structure of the fluid shock absorber according to the preferred embodiment of the present invention.
Figure 5:
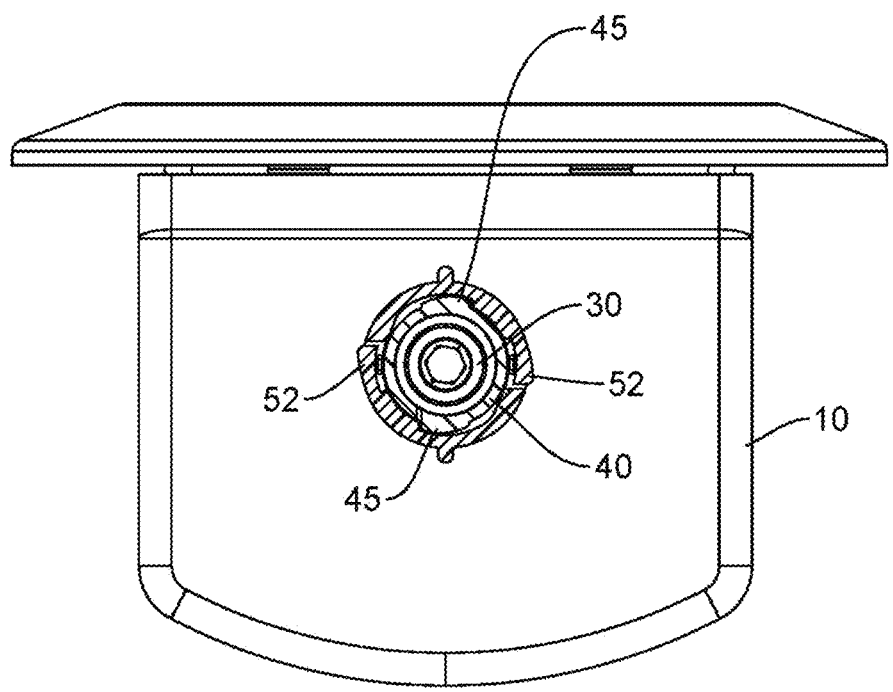
FIG. 5 is a cross sectional view showing the operation of the quick connector structure of the fluid shock absorber according to the preferred embodiment of the present invention.
Figure 6:
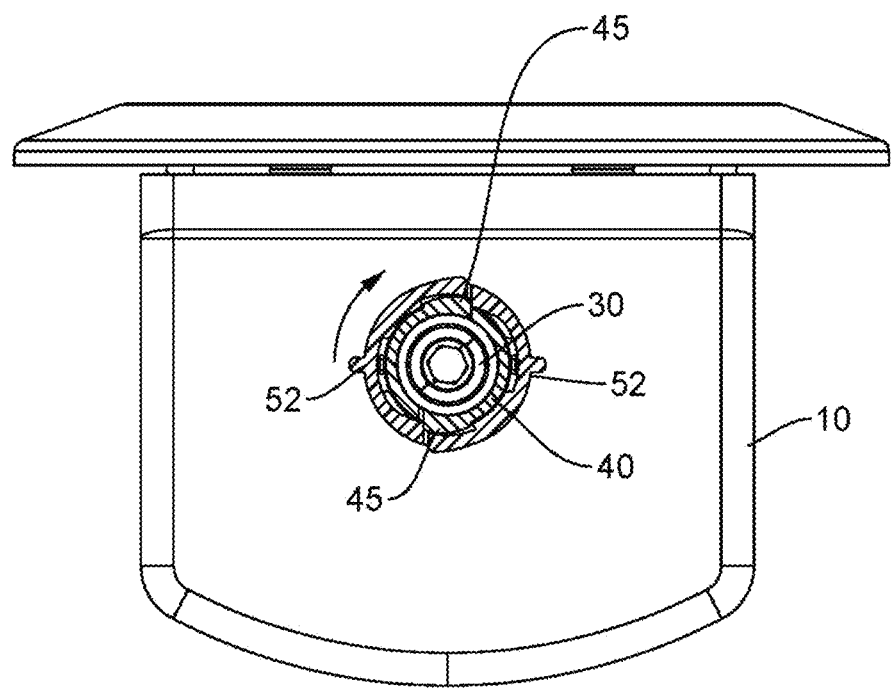
FIG. 6 is another cross sectional view showing the operation of the quick connector structure of the fluid shock absorber according to the preferred embodiment of the present invention.

With reference to FIGS. 4-5, the defining ring 50 is fitted on the fixer 40, as shown in FIG. 6, and the defining ring 50 is rotated so that the at least one U-shaped fixing portion 52 of the multiple indents 51 is engaged with the multiple flexible portions 45, thus fixing the connection valve 40 on the pipeline box 10. When desiring to maintain the connection valve, the rotation portion 53 is rotated to drive the defining ring 50 to revolve, and the multiple flexible portions 45 rotatably remove from the at least one U-shaped fixing portion 52, thus detaching the defining ring 50 from the fixer 40.

Thereby, the connection valve 30 is fitted on the fixer 40 and is inserted in the pipeline box 10, and the defining ring 50 is fitted on a bottom of the fixer 40 to manually connect the connection valve 30, the fixer 40, and the defining ring 50 easily.

Preferably, the multiple flexible portions 45 are engaged on the at least one U-shaped fixing portion 52 securely to avoid a removal, and the at least one U-shaped fixing portion 52 is fixed in the same direction as the U-shaped recess 44 to avoid the removal of the defining ring 50 from the connection valve 30.

While the first embodiments of the invention have been set forth for the purpose of disclosure, modifications of the disclosed embodiments of the invention as well as other embodiments thereof may occur to those skilled in the art. The scope of the claims should not be limited by the first embodiments set forth in the examples, but should be given the broadest interpretation consistent with the description as a whole.

What is claimed is:

1. A quick connector structure of a fluid shock absorber being applicable for a pipeline box, and the pipeline box being configured to connect with a connection valve of at least one pipe line, the pipeline box including a coupling orifice configured to connect with the connection valve;

wherein the connection valve includes a fixer, and the fixer has a cylinder, multiple positioning bosses located on an outer wall of the cylinder, at least one U-shaped recess defined below the multiple positioning bosses, and one of multiple flexible portions extending out from of the at least one U-shaped recess;

wherein the coupling orifice of the pipeline box has multiple notches defined therein and corresponding to the multiple positioning bosses, and the coupling orifice also has multiple cutouts corresponding to the multiple flexible portions of the fixer, wherein the coupling orifice of the pipeline box accommodates the connection valve, and the multiple notches are engaged with the multiple positioning bosses, thus fixing the connection valve;

wherein the pipeline box includes a defining ring, and the defining ring has multiple indents arranged on a center of the defining ring in a cross shape, at least one U-shaped fixing portion corresponding to two opposite indents of the multiple indents, wherein the at least one U-shaped fixing portion is fixed in a same direction as the U-shaped recess;

wherein the defining ring is fitted on the fixer, and the defining ring is rotated so that the at least one U-shaped fixing portion of the multiple indents is engaged with the multiple flexible portions, thus fixing the connection valve on the pipeline box; when desiring to maintain the connection valve, the rotation portion is rotated to drive the defining ring to revolve, and the multiple flexible portions rotatably remove from the at least one U-shaped fixing portion, thus detaching the defining ring from the fixer.

2. The quick connector structure as claimed in claim 1, wherein the cylinder has a hexagonal head located on an end thereof.

3. The quick connector structure as claimed in claim 1, wherein the defining ring further includes two rotation portions symmetrically located on an outer wall thereof.

* * * * *